US012807845B2

(12) United States Patent
Schmiedl

(10) Patent No.: US 12,807,845 B2

(45) Date of Patent: Nov. 24, 2026

(54) TEXTILE CARRIER MATERIAL FOR ADHESIVE TAPES HAVING A FORMED TEAR-OFF EDGE

(71) Applicant: Technitex Sachsen GmbH, Hohenstein-Ernstthal (DE)

(72) Inventor: Erik Schmiedl, Niederwiesa (DE)

(73) Assignee: Technitex Sachsen GmbH, Hohenstein-Ernstthal/OT Wüstenbrand (DE)

( * ) Notice: Subject to any disclaimer, the term of this patent is extended or adjusted under 35 U.S.C. 154(b) by 777 days.

(21) Appl. No.: 18/015,534

(22) PCT Filed: Jul. 17, 2020

(86) PCT No.: PCT/EP2020/070270

§ 371 (c)(1),
(2) Date: Jan. 11, 2023

(87) PCT Pub. No.: WO2022/012753

PCT Pub. Date: Jan. 20, 2022

(65) Prior Publication Data

US 2023/0257634 A1 Aug. 17, 2023

(51) Int. Cl.
*D04B 21/16* (2006.01)
*C09J 7/21* (2018.01)

(52) U.S. Cl.
CPC .............. *C09J 7/21* (2018.01); *D04B 21/165* (2013.01); *C09J 2203/302* (2013.01); *C09J 2301/16* (2020.08)

(58) Field of Classification Search
None
See application file for complete search history.

(56) References Cited

U.S. PATENT DOCUMENTS 4,435,467 A 3/1984 Rogers
2006/0042325 A1* 3/2006 Callaway .............. D04B 21/16 66/176
2007/0193491 A1 8/2007 Lilleheden

FOREIGN PATENT DOCUMENTS

DE 29804431 U1 9/1998
DE 20220103 U1 4/2004
(Continued)

OTHER PUBLICATIONS

English Translation of EP 2128212 Dec. 2009 (Year: 2009).*

*Primary Examiner* — Jenna L Johnson
(74) *Attorney, Agent, or Firm* — GREENBLUM & BERNSTEIN, P.L.C.

(57) ABSTRACT

The invention lies in the technical field of the textile industry and relates to a textile carrier material for adhesive tapes having a formed tear-off edge, which can be used in the automotive industry for wrapping cable sets, elongate material and lines. The problem addressed by the invention is to provide a textile carrier material for adhesive tapes having improved longitudinal strength while having improved manual tearability and stitch run stop. The problem is solved by a textile carrier material which has at least one areal region with longitudinal strength and a transverse tear-off region in the form of a tear-off edge, wherein the areal region with longitudinal strength has longitudinal stitches, produced by means of pillar stitching, of one or more consolidation threads, and wherein the transverse tear-off region has been formed at least by one or more consolidation threads formed with at least one lateral offset stitch, which are arranged at an angle of 1° to 90° to the consolidation threads arranged in a longitudinally oriented manner.

7 Claims, 1 Drawing Sheet

(56) References Cited

FOREIGN PATENT DOCUMENTS

| | | | | |
|---|---|---|---|---|
| DE | 102006022765 | A1 | 11/2007 | |
| DE | 202014106249 | U1 | 3/2016 | |
| EP | 0668336 | A1 | 8/1995 | |
| EP | 0668363 | B2 | 8/2001 | |
| EP | 2128212 | A2 * | 12/2009 | ................ C09J 7/21 |
| EP | 2128212 | B1 | 1/2016 | |

* cited by examiner

TEXTILE CARRIER MATERIAL FOR ADHESIVE TAPES HAVING A FORMED TEAR-OFF EDGE

CROSS REFERENCE TO RELATED APPLICATIONS

This application is the U.S. national stage of International Application No. PCT/EP2020/070270, filed on 2020 Jul. 17.

BACKGROUND

The invention pertains to the technical field of the textile industry and relates to a textile carrier material for adhesive tapes, having a formed tear-off edge. The textile carrier material is intended for adhesive tapes and can be employed in the automotive industry for the bandaging of cable harnesses, elongated items, and leads. The textile carrier material may be provided with at least one single-sided adhesive coating, adhesive layer and/or film.

Adhesive tapes produced from textile carrier materials are employed and processed in the automotive industry and also in other industry sectors. Some of the reasons for this are their positive qualities in terms of noise damping, longevity, heat stability, strength, and good processing qualities.

It is widely known that nonwoven carriers can be processed into adhesive tapes for the jacketing of cable looms.

EP2128212 discloses an adhesive tape particularly for the jacketing of elongated items such as, in particular, cable harnesses, having a nonwoven-based carrier provided at least on one side with an adhesive coating, the carrier having a basis weight of 30 to 120 g/m<2>. The carrier consists of at least one ply of a preconsolidated nonwoven, more particularly of a spunbond, a meltblown web or a mechanically consolidated stable fiber web, which is overstitched with a multiplicity of threads, the thread density being less than 22 threads per 25 mm carrier width, preferably between 9 and 20 threads per 25 mm.

It is known that the nonwoven can be consolidated using compound needle and pintel wire by formation of loops from the nonwoven itself, with no threads being used at all. This principle can be used for relatively heavy materials. It is disadvantageous in terms of fiber pull-out in the subsequent adhesive tape, since during usage of the adhesive tape, fibers are loosened as a result of the adhesive layer, and prevent the adhesive tape being reattached.

DE 29 804 431 U1 discloses an adhesive tape, more particularly wrapping tape for the bundling of cables in motor vehicles, having a tapelike polyester nonwoven carrier and having a coating of adhesive applied on one or both sides, the nonwoven being a spunbond. The adhesive tape disclosed is produced without any interlooping by means of fibers or threads, and has a very high elongation at break of up to more than 50%. A disadvantage is that such carriers cannot be used for adhesive tapes for application in the cable harness sector. The increased elongation at break leads to bulges and to tapering of the material during wrapping of the cable looms.

DE 10 2006 022 765 A1 discloses an adhesive tape having a tapelike nonwoven carrier and having at least one coating of adhesive on one or both sides, with the nonwoven carrier comprising a plurality of stabilizing threads which run continuously at least in the longitudinal direction of the tape and which are arranged on the surface of the carrier and/or in its interior. The adhesive tape described does have good strength properties, but because of the production of two textile layers it is too expensive and inefficient to produce.

EP 0668363 discloses a nonwoven-fabric carrier formed from Maliwatt stitchbonded web, in which the nonwoven material is consolidated by a multiplicity of parallel thread stitches. Since in this case the fiber structure in the nonwoven is not altered by the overstitching and formation of consolidating thread loops, the fiber parts in the nonwoven fabric are not securely interlooped with one another. As a result, at cut edges and on both surfaces, unwanted severe pull-out or abrasion phenomena are produced during processing and usage. By virtue of its structure and arrangement of the loops, the pillar stitching ensures sufficient strength in the longitudinal direction and also very good noise damping, generated by the raised and lowered structures in the material that are formed as a result of the technology. This is provided by the stitching threads which run parallel to one another and which uniformly lace the fibers in. The disadvantage of this pillar stitching is that the material subsequently is more difficult to tear by hand and that, after the adhesive tape has been torn off, a stitching-induced loop run develops.

It is also known that tricot stitching is employed in order to consolidate nonwoven fabrics by means of Maliwatt technology. In the adhesive tape application, this stitching has the advantage of improving the hand tearability and preventing the loop running (the separation of the loops after tearing). As a result of the zig-zag structure, however, the tricot stitching results in increased elongation values in the material, with the consequence in turn of tapering of the adhesive tape on tensile stressing during processing, and so its possibilities for use are only very limited. Moreover, in the case of tricot stitching, the proportion of thread material is increased relative to pillar stitching.

SUMMARY

The object of the invention is to provide a—relative to the prior art—textile carrier material for adhesive tapes which has an improved longitudinal strength while having improved hand tearability and loop run stoppage.

The object is achieved by the invention specified in the claims. Advantageous configurations are the subject of the dependent claims, with the invention also including combinations of the individual dependent claims in the sense of an "and" conjunction, provided they are not mutually exclusive.

BRIEF DESCRIPTION OF THE FIGURES

The particulars shown herein are by way of example and for purposes of illustrative discussion of exemplary embodiments of aspects of the present disclosure only and are presented in the cause of providing what is believed to be the most useful and readily understood description of the principles and conceptual aspects of the present disclosure. In this regard, no attempt is made to show structural details in more detail than is necessary for the fundamental understanding of the aspects of the present disclosure, the description taken with the drawings making apparent to those skilled in the art how the forms of the aspects of the present disclosure may be embodied in practice.

DETAILED DESCRIPTION

Figure 1:
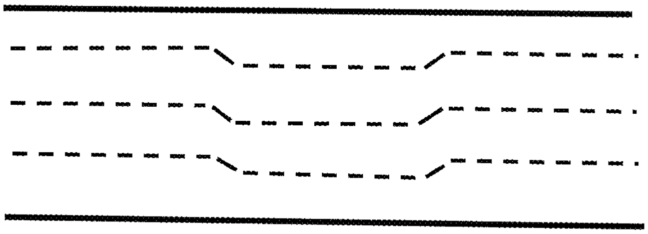
FIG. 1 shows a schematic representation of a textile carrier material of Example 1 in accordance with aspects of the disclosure.

The invention provides a textile carrier material for adhesive tapes, comprising one or more plies of a nonwoven material or nonwoven fabric which has at least one formed areal region with longitudinal strength and at least one transverse tear-off region formed as a tear-off edge, the areal region with longitudinal strength comprising one or more longitudinally oriented loops, produced by means of pillar stitching, of one or more consolidation threads which are stitched to the nonwoven material or nonwoven fabric, and the transverse tear-off region being formed at least by one or more consolidation threads formed with at least one lateral offset with offset stitching, wherein the laterally offset consolidation thread or threads, by mechanically and/or electronically adjustable guide bars, are arranged at an angle of 1° to 90° to the longitudinally oriented consolidation threads and stitched to the nonwoven material or nonwoven fabric.

Advantageously the one or more laterally offset consolidation threads are arranged at an angle of 30° to 75° to the longitudinally oriented consolidation threads and stitched to the nonwoven material or nonwoven fabric.

It is additionally advantageous if one or more longitudinally oriented loops produced by means of pillar stitching are formed after the laterally offset consolidation threads arranged with offset stitching.

It is likewise advantageous if the transverse tear-off region is produced with periodic or aperiodic repetition at least after at least one longitudinally oriented loop with pillar stitching.

Moreover, in one advantageous embodiment of the carrier material, the stitch length of the offset stitching in the region of the transverse tear-off region is different from the stitch length of the loops with pillar stitching.

It is additionally advantageous if the nonwoven material, the nonwoven fabric and/or the consolidation threads consist of fibers and/or filaments of polyamide, polypropylene, polyethylene, polyester and/or natural fibers.

Also advantageously the textile carrier material is provided at least on one side with an adhesive coating, adhesive layer and/or film, and with particular advantage the adhesive coating, the adhesive layer and/or film is composed of natural material and/or synthetic material.

In a further advantageous configuration of the carrier material, foams, wovens, formed-loop knits, drawn-loop knits, and textile and nontextile roll products are present.

The textile carrier material of the invention can be used as adhesive tape for jacketing cable harnesses, leads and/or elongated items.

The achievement of the object according to the invention lies in the specifying of a carrier material for adhesive tapes with a formed tear-off edge and loop run stoppage, the tapes exhibiting an improved longitudinal strength while having improved hand tearability.

This is achieved by means of a textile carrier material for adhesive tapes that comprises one or more plies of a nonwoven material or nonwoven fabric that comprises at least one formed areal region with longitudinal strength and at least one tear-off edge in the form of a specially formed transverse tear-off region.

A formed areal region with longitudinal strength is intended to mean, in the context of the invention, a region of the nonwoven material or nonwoven fabric that has an improved longitudinal strength as a result of the stitched-in consolidation threads. The areal region with longitudinal strength in this case comprises one or more longitudinally oriented loops of the consolidation thread or threads, these loops being produced by means of pillar stitching.

Longitudinally oriented is intended to mean, in accordance with the invention, that the seam formed from loops is arranged substantially parallel to the substantially tapelike textile carrier material or adhesive tape and to the production direction.

The transverse tear-off region constitutes a separate region of the nonwoven material or nonwoven fabric in which the consolidation threads are not stitched in pillar stitching, so that in this region the hand tearability is particularly good and easy in the transverse direction of the textile, tapelike textile carrier material and, moreover, loop running on the part of the longitudinally oriented loops, arranged previously, of the pillar stitching is prevented.

The formation of the transverse tear-off region is such that the loops are present with a lateral offset over at least 1 or two or more needle divisions of the one or more consolidation threads as offset stitching and, in differentiation from the longitudinally oriented pillar stitching, are stitched to the nonwoven material or nonwoven fabric at a desired angle to the longitudinal alignment of the consolidation thread. The one or more consolidation threads arranged by lateral offset here are established by mechanically and/or electronically adjustable guide bars and are stitched to the nonwoven material or nonwoven fabric at an angle of 1° to 90° to the production direction.

It is particularly significant that the offset stitching of the laterally offset consolidation threads, formed in accordance with the invention, is neither a pillar stitching nor a tricot stitching. Instead, the lateral offset of the invention over at least 1 or two or more needle divisions is to be understood as one or more consolidation threads which are offset laterally in machine direction and which effectively prevent the running of loops in pillar stitching and which, as a result of the angularly offset arrangement in the textile carrier material, define a transverse tear-off region in which facilitated hand tearability in transverse direction is made possible.

It is particularly advantageous for the formation of the transverse tear-off region if the one or more offset stitching of the laterally offset consolidation threads are arranged at an angle of 30° to 75° to the alignment of the longitudinally oriented loops of the pillar stitching. The size of the transverse tear-off region in this case can be varied in a particularly simple way through a plurality of parameters.

Depending on customer requirement and specific application, the width of the transverse tear-off region in the nonwoven fabric or nonwoven material may be formed as a kind of "tear-off edge".

The angle and length of the lateral offset of the offset stitching of the consolidation threads are adjusted here, for example, by a freely selectable curve, to be programmed, which corresponds neither to the tricot nor to the pillar stitching. In technical terms this is achieved, for example, by an electronic offsetting of the needle bar(s) by one or more divisions during the production operation. The distance at which the offsetting of the needle bar is to take place is therefore freely selectable. The offset path via one or more needles simultaneously in, for example, any desired repetition and pattern accuracy produces a wide diversity of new structures, tailored to the requirements imposed on the subsequent adhesive tape.

In the case of the electronic solution, different versions of textile carrier materials can be produced within a roll of carrier material to be produced. A mechanical solution produces a pre-specified version in always the same pattern repetition.

It is advantageous if the consolidation thread or threads are stitched to the nonwoven material or nonwoven fabric with at least one lateral offset of the offset stitching at an angel of 30° to 75°. It is also possible for the size of the transverse tear-off region to be determined by the stitch length of the offset stitching, which may be greater or smaller than the stitch length of the longitudinally oriented loops with pillar stitching. As a result, a transverse tear-off region is provided which is variable in its size.

In order to produce a carrier material with defined distances between the transverse tear-off regions, it is possible advantageously for the transverse tear-off region to have been produced with periodic or aperiodic repetition at least after at least one loop with longitudinally oriented pillar stitching.

Materials of the nonwoven material intended in particular for mass production, and/or the consolidation threads, are composed of polyamide, polypropylene, polyethylene, polyester and/or natural fibers and enable the provision of an inexpensive material which is easy to process.

For use as an adhesive tape for the wrapping of cable looms or elongated items, there may advantageously be an adhesive coating or adhesive layer present at least on one side and consisting with particular advantage of natural material and/or synthetic material. An adhesive coating may be formed, for example, in dots or in stripes or else as a continuous adhesive layer over the full area of the textile carrier material.

Furthermore, provision may be made for the textile carrier material to be joined at least on one side, additionally, to films, foams, wovens, formed-loop knits and/or drawn-loop knits or other textile and nontextile roll products, in order to provide a specific functionality for the envisaged use.

DETAILED DESCRIPTION OF THE PREFERRED EMBODIMENTS

The invention is elucidated in more detail below by means of two exemplary embodiments.

Exemplary Embodiment 1

A stable fiber nonwoven having a weight of 55 g/m$^2$ and made of polyester is consolidated by stitching threads using a Maliwatt stitchbonding machine.

The fineness of the machine is indicated as F14.

The nonwoven material is consolidated by an electronically programmed pattern stitching.

FIG. 1 shows a schematic representation of a textile carrier material of Example 1 in accordance with aspects of the disclosure. As schematically shown in FIG. 1, after having tied off 18 loops, the needle bar moves by one division to the right and again starts the tying-off of 18 loops, before returning back to its original position. This is operated repeating over the entire width of the unit for 1500 linear meters. The further 1500 linear meters are produced with a shorter spacing. The offset of the needle bar in the transverse direction, for generating the offset stitching and forming the tear-off edge, takes place after just five loops in production direction. The offset path forms the tear-off region, since it interrupts the longitudinally oriented pillar seam as a result of the lateral offset of the consolidation threads in offset stitching.

The region produced as a result can be fairly easily severed by hand, and loop running of the longitudinally oriented consolidation threads is stopped at this point.

Exemplary Embodiment 2

Figure 2:
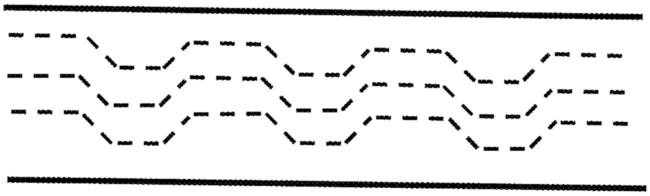
FIG. 2 shows a schematic representation of a textile carrier material of Example 2 in accordance with aspects of the disclosure.

A spunbond material having a weight of 65 g/m$^2$ is consolidated in longitudinal direction by means of a Karl Mayer knitting machine. The machine fineness is E18. FIG. 2 shows a schematic representation of a textile carrier material of Example 2 in accordance with aspects of the disclosure. As schematically shown in FIG. 2, a preprogrammed pattern is employed which is composed of longitudinally oriented loops and the laterally offset loops, with the machine, after 3 pillar stitching procedures, being offset by two needles in each case, before returning back to the original position after 2 further tie-offs. As a result of the longitudinally oriented loops in pillar stitch, the desired noise damping and strength properties are established, and by the offset stitching offset by two needles in each case after 3 pillar stitching procedures, the transverse tear-off region is established for easy hand tearability.

The invention claimed is:

1. A textile carrier material for adhesive tapes, comprising:

one or more plies of a nonwoven material which has a plurality of areal regions with longitudinal strength in an alternating pattern along a longitudinal direction of the textile carrier material with a plurality of transverse tear-off regions formed as a tear-off edge, the areal regions with longitudinal strength comprising one or more consolidation threads which are stitched to the nonwoven material to form one or more longitudinally oriented pillar stitch loops, produced by pillar stitching, and the transverse tear-off regions being formed at least by the one or more consolidation threads which are stitched with an offset stitch to the nonwoven material at an angle of 1° to 90° to a longitudinal direction of the longitudinally oriented pillar stitch loops and formed with at least one lateral offset from the longitudinally oriented pillar stitch loops, wherein the one or more longitudinally oriented pillar stitch loops of each areal region are offset in a transverse direction of the textile carrier material from the one or more longitudinally oriented pillar stitch loops of each adjacent areal region along the longitudinal direction of the textile carrier material.

2. The carrier material as claimed in claim 1, wherein the one or more consolidation threads which are stitched with offset stitching to the nonwoven material are arranged at an angle of 30° to 70° to a longitudinal direction of the longitudinally oriented pillar stitch loops.

3. The carrier material as claimed in claim 1, wherein the alternating pattern of areal regions and the transverse tear-off regions is a periodic or aperiodic repetition.

4. The carrier material as claimed in claim 1, wherein a stitch length of the offset stitching in the region of the transverse tear-off region differs from the stitch length of the pillar stitch loops.

5. The carrier material as claimed in claim 1, wherein the nonwoven material and/or the consolidation threads consist of fibers and/or filaments of polyamide, polypropylene, polyethylene, polyester, and/or natural fibers.

6. The carrier material as claimed in claim 1, wherein the textile carrier material is provided at least on one side with an adhesive coating, adhesive layer and/or film.

7. The carrier material as claimed in claim 6, wherein the adhesive coating, the adhesive layer and/or film is composed of natural material and/or synthetic material.

* * * * *